(12) United States Patent
Placer

(10) Patent No.: US 11,097,614 B2
(45) Date of Patent: Aug. 24, 2021

(54) RIDE-ON TOY WITH ELECTRONIC SPEED CONTROL SYSTEM

(71) Applicant: ML Toys, LLC, Howell, NJ (US)

(72) Inventor: Alan Placer, Howell, NJ (US)

(73) Assignee: ML Toys, LLC, Howell, NJ (US)

( * ) Notice: Subject to any disclaimer, the term of this patent is extended or adjusted under 35 U.S.C. 154(b) by 99 days.

(21) Appl. No.: 16/681,039

(22) Filed: Nov. 12, 2019

(65) Prior Publication Data
US 2021/0138900 A1     May 13, 2021

(51) Int. Cl.
| | |
|---|---|
| *B60K 26/02* | (2006.01) |
| *B62K 23/08* | (2006.01) |
| *B60T 7/04* | (2006.01) |
| *H02P 7/29* | (2016.01) |
| *A63H 29/22* | (2006.01) |
| *B60R 16/023* | (2006.01) |

(52) U.S. Cl.
CPC ............. *B60K 26/02* (2013.01); *A63H 29/22* (2013.01); *B60R 16/0231* (2013.01); *B60T 7/042* (2013.01); *B62K 23/08* (2013.01); *H02P 7/29* (2013.01); *B60K 2026/025* (2013.01)

(58) Field of Classification Search
CPC ........ B60K 26/02; B60K 26/021; B60T 7/042
See application file for complete search history.

(56) References Cited

U.S. PATENT DOCUMENTS

| | | | | | |
|---|---|---|---|---|---|
| 4,639,646 | A * | 1/1987 | Harris | ...... | B60L 50/52 318/139 |
| 5,764,009 | A * | 6/1998 | Fukaya | ...... | H02P 3/14 318/300 |
| 6,347,679 | B1 * | 2/2002 | Dignitti | ...... | B60R 16/04 180/65.1 |
| 6,422,330 | B1 * | 7/2002 | Harris | ...... | B62K 9/00 180/65.1 |
| 6,714,127 | B2 * | 3/2004 | Perez | ...... | B60Q 1/444 340/436 |
| 7,438,148 | B1 * | 10/2008 | Crea | ...... | B62D 1/24 180/167 |
| 2002/0113564 | A1 * | 8/2002 | Reile | ...... | B60L 50/52 318/139 |
| 2002/0163141 | A1 * | 11/2002 | Pardi | ...... | A63G 19/20 280/1.202 |

(Continued)

*Primary Examiner* — Thai T Dinh
(74) *Attorney, Agent, or Firm* — Offit Kurman, P.A.; Steven Scott Lloyd

(57) ABSTRACT

A ride-on toy with electronic speed controller for superior user experience is described herein. A ride-on toy as described herein may be in the form of a ride-on toy car, truck, jeep, motorcycle or the like and may be used with up to a 24-volt power source as opposed to a 12-volt power source as is common in the art. An electronic speed controller of the present disclosure provides variable speed control to at least one and preferably at least two motors from separate accelerator and brake mechanisms such as pedals. Conventional ride-on toys such as those described herein typically contain a single-pole switch such as pedal that provides all-or-nothing power to a motor as opposed to modulation of two motors by two actuation means. A ride-on toy as described herein may combine various controller components in unique ways to achieve the superior results as described herein.

10 Claims, 5 Drawing Sheets

(56) References Cited

U.S. PATENT DOCUMENTS

| | | | |
|---|---|---|---|
| 2011/0012548 A1* | 1/2011 | Wilcox | B62J 27/00 |
| | | | 318/468 |
| 2016/0296848 A1* | 10/2016 | Taylor | B60L 3/0092 |
| 2018/0120848 A1* | 5/2018 | Kulferst | G01C 21/362 |

* cited by examiner

RIDE-ON TOY WITH ELECTRONIC SPEED CONTROL SYSTEM

STATEMENT REGARDING FEDERALLY SPONSORED RESEARCH OR DEVELOPMENT

This invention was made without federal funding.

BACKGROUND OF THE INVENTION

The invention relates to the field of electrically powered ride-on toys such as toy cars, trucks, jeeps, trikes and the like. Currently, ride-on toys are typically powered by 12-volt rechargeable batteries and are equipped with a device that acts as an on-off switch for actuating a motor when a pedal is depressed, for example, with the motor then being shut down upon release of the pedal. For example, a child riding a battery-powered car may depress a simulated accelerator pedal that when depressed partially or fully causes the power train to engage the wheels and propel the vehicle at a single speed in a selected direction. When the pedal is released, the vehicle comes to a stop.

The present invention addresses a long felt need in the art for a ride-on toy that allows for variable speed control and is provided with a brake pedal, as opposed to a single-speed configuration with on-off switch as described above. The current wiring design common to ride-on toys does not allow for any modification of electrical circuits or changes in voltage without off-label modifications such as those enabled by the present invention. The present invention comprises a new circuit board configuration and pedal design to meet the need for a variable speed ride-on toy vehicle with braking capability independent from the accelerator pedal.

BRIEF SUMMARY OF THE INVENTION

The invention of the present disclosure comprises an electrical circuit and pedal design that allows for variable speed control of a ride-on toy vehicle as well as an independent braking mechanism that causes power reductions to at least one motor. The invention also allows for up to 24-volt power, which is not currently available in the market for ride-on toys. It is an object of the invention to improve the experience of a rider of a ride-on toy comprising an electronic speed controller and brake as described herein by allowing for better speed control and braking. It is another object of the invention of the present disclosure to allow for a vehicle powered by an electronic speed controller as described herein to achieve greater speeds.

An exemplary electrical circuit of the present invention comprises circuitry responsive to a dual pedal configuration that leverages the ability of pedals to actuate electrical components capable of modulating the power from a battery to at least one motor, with one pedal being used to increase power (accelerate) and the other to decrease power (brake). In one embodiment, a ride-on toy drive train of the present disclosure comprises two pedals each electrically connected to a controller for transmission of electrical signals corresponding to the physical actuations of the pedals to a motor drive circuit capable of transducing the electrical signals received into motor drive according to the power desired by the user. This allows for variable motor control and a driving experience that allows the user of a ride-on toy to have more subtle control of the movement of the toy while also enjoying greater maximum power for a faster ride.

DETAILED DESCRIPTION OF THE INVENTION

The invention of the present disclosure comprises an electronic speed controller and brake suitable for application in ride-on toys to improve the experience of the rider of such a toy. It is an object of the present invention to scientifically quantify the input quantity of force associated with the actuation of a simulated throttle such as a simulated accelerator pedal or handlebar throttle such as are common to motorcycles. It is another object of the invention to correlate the input force applied by a rider with the purpose intended by the act of actuating a throttle, for example. Based on the motion superposition of an accelerator and brake, for example, output signals are generated that achieve the desired vehicle motion. Thus, through coordination of a throttle and brake, for example, a more realistic driving experience is achieved, as well as better safety and comfort at higher speeds.

Figure 1A:
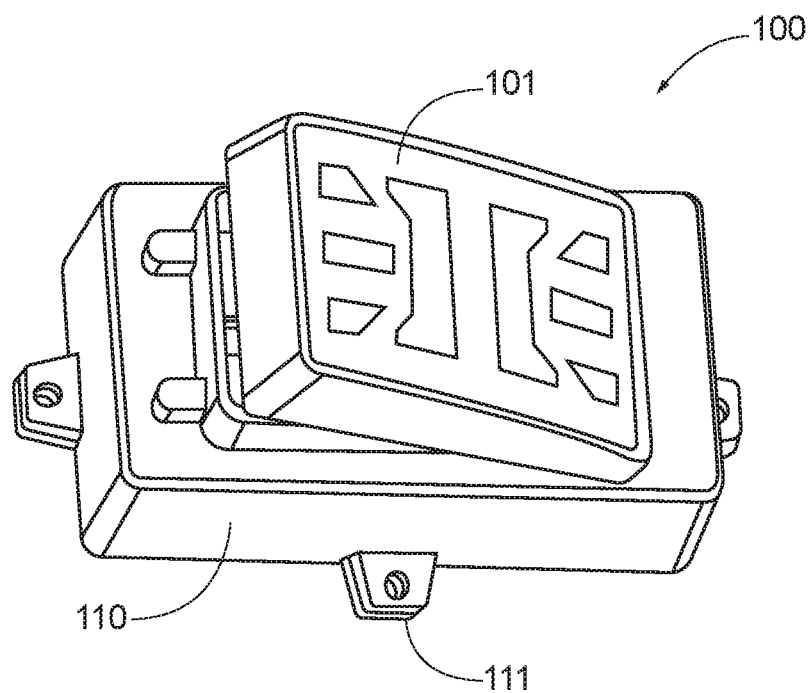
FIGS. 1A and 1B illustrate one embodiment of a pedal of the present disclosure in perspective view and side view, respectively.

Turning now to the appended drawings, FIG. 1A provides a perspective view of an exemplary pedal assembly 100 of a preferred embodiment of the invention of the present disclosure. A pedal assembly 100 as shown in FIG. 1A comprises a hinged pedal 101 attached to a base platform 110 to allow upward and downward movement of the pedal 101 about the hinge (not shown) above the base platform 110. The pedal is further configured with mounting studs 111 to allow for mounting of the pedal to the chassis of a ride-on toy or equivalent.

Figure 1B:
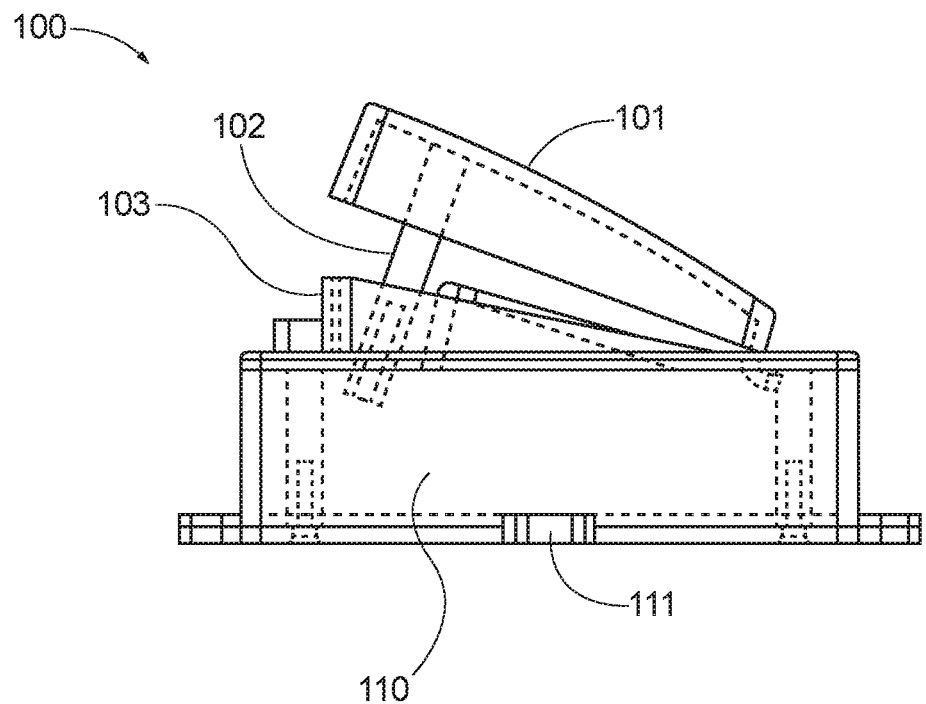

FIG. 1B shows a side view of an exemplary pedal assembly as shown in FIG. 1A with pedal 101 base platform 110 and mounting studs 111. Further illustrated is a shaft 102 used to actuate, via mechanical or optical means, for example, an electrical component modulator capable of regulating the voltage supplied to one or more motors of a ride-on toy of the present disclosure. Also provided is a shaft guide 103 that functions to keep the shaft 102 in appropriate alignment with the electrical component modulator with which it is in communication. The shaft guide 103 also prevents the pedal 101 from pushing the shaft 102 too far downward and prevents damage to the assembly.

Figure 2:
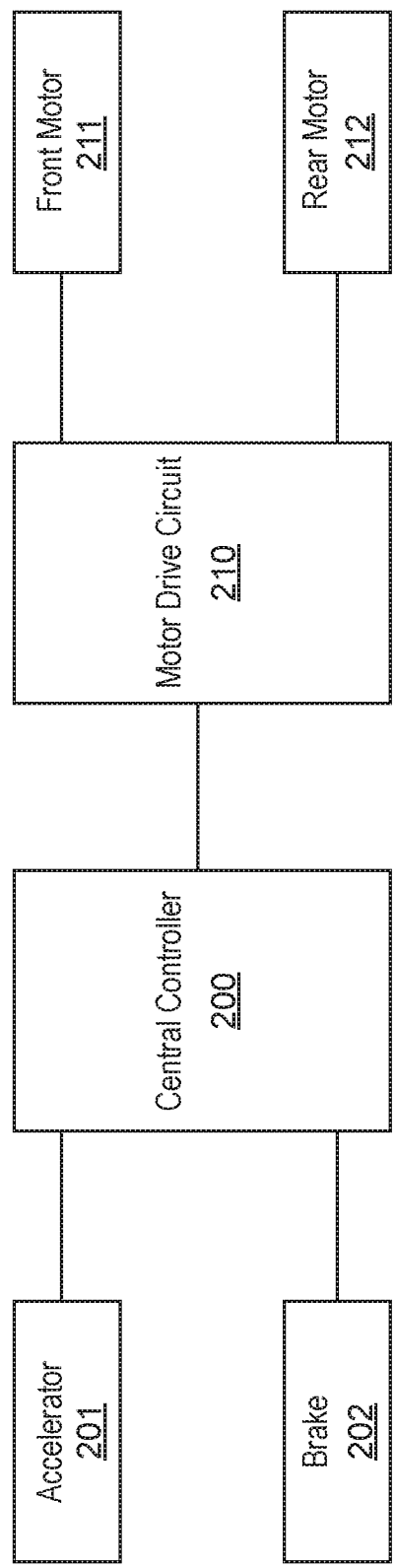
FIG. 2 is a technical block diagram of an embodiment of the present disclosure.

Looking to FIG. 2, a technical block diagram is provided. The pedal assemblies mounted within a ride-on toy according to the present disclosure correspond to an accelerator 201 and a brake 202. Accelerator 201 and brake 202 actually cause inverse variable modulation of power to the vehicle motors. Each of the accelerator 201 and brake 202 are connected electrically to a central controller 200 configured to transmit information to a motor drive circuit 210 in response to the application or removal of physical force to either pedal, allowing for up to 24-volt variable speed control of left motor 211 and right motor 212.

Figure 3:
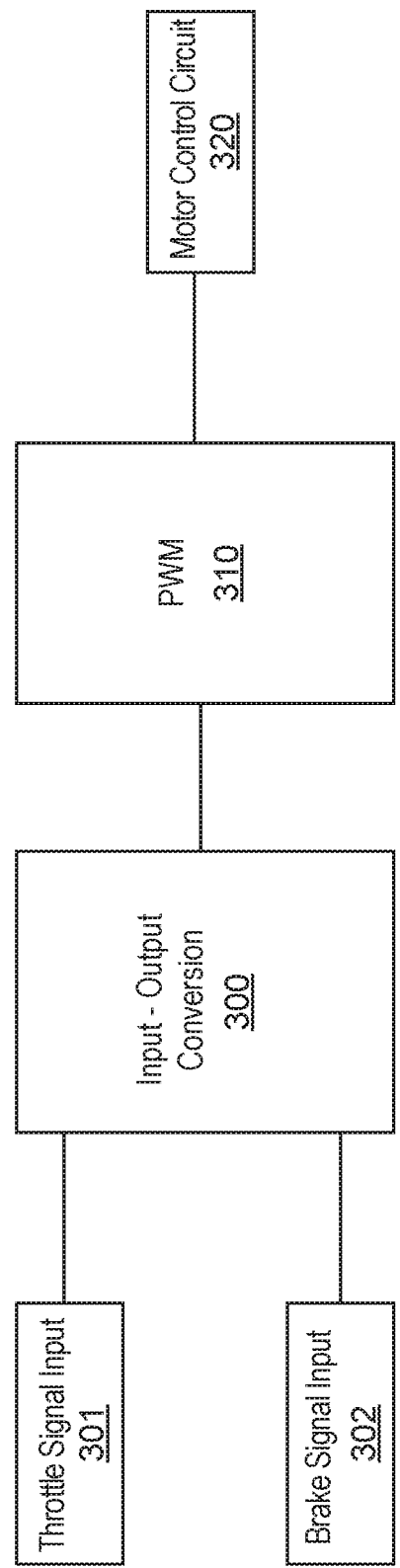
FIG. 3 is a functional block diagram of an embodiment of the present disclosure.

FIG. 3 provides a functional block diagram corresponding to the technical block diagram of FIG. 2. That is, throttle signal input 301 is provided by actuating the accelerator 201, while a brake signal input 302 is supplied when the brake 202 is depressed. Increase in the throttle signal input 301 causes an increase in electrical power to the motors, while the brake signal input 302 causes a decrease proportional to the pressure applied to the pedal. Meanwhile, input-output conversion 300 is facilitated by central controller 200, which is configured with a microcontroller unit that collects analog signal data electrically transmitted from the pedals and performs quantitative conversion of the input signal to an output signal based on predetermined calculation equations programmed into the microcontroller. Based on the output signal from the microcontroller unit, power is modulated to at least one motor from a power source such as a 24-void battery. A microcontroller of the present disclosure includes an electrical circuit for controlled modulation of the motors.

Figure 4A:
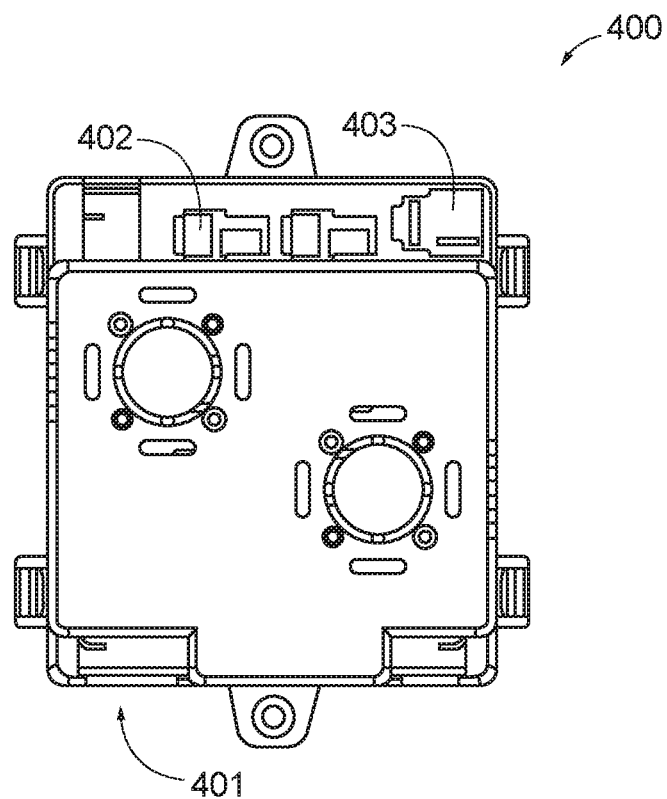
FIGS. 4A and 4B illustrate one embodiment of a central controller and motor drive circuit of the present disclosure in top view and perspective view, respectively.
Figure 4B:
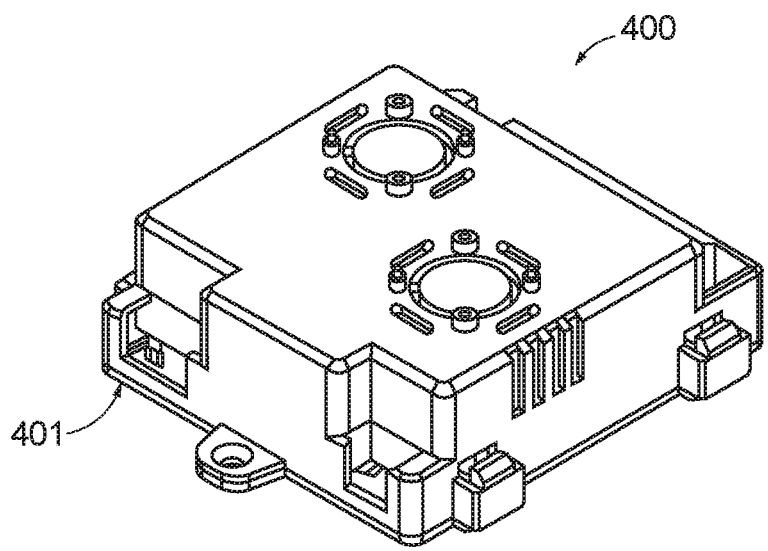

FIG. 4A is an overhead view of a microcontroller housing 400 according to one embodiment of the present disclosure. A microcontroller housing 400 includes an electrical connection input port 401 for connection with electrical leads from the pedal assemblies that enable operation of the pedals to accelerate and brake variable speed motors of a ride-on toy equipped with electronic speed controller as described herein. A microcontroller housing 400 further includes a motor drive output port 402 capable of receiving an electrical connection to at least one motor for variable speed control of the at least one motor as well as battery connection port 403 for power input from a 24-volt battery for example. A perspective view of a microcontroller housing 400 according to one embodiment of the present invention showing input port 401 is provided at FIG. 4B. Microcontroller housings and pedal assemblies may be arranged and mounted within a chassis or a ride-on toy to enable easy connection of a microcontroller as described herein with power source and at least one motor for variable speed control in response to application of force to each pedal.

Figure 5:
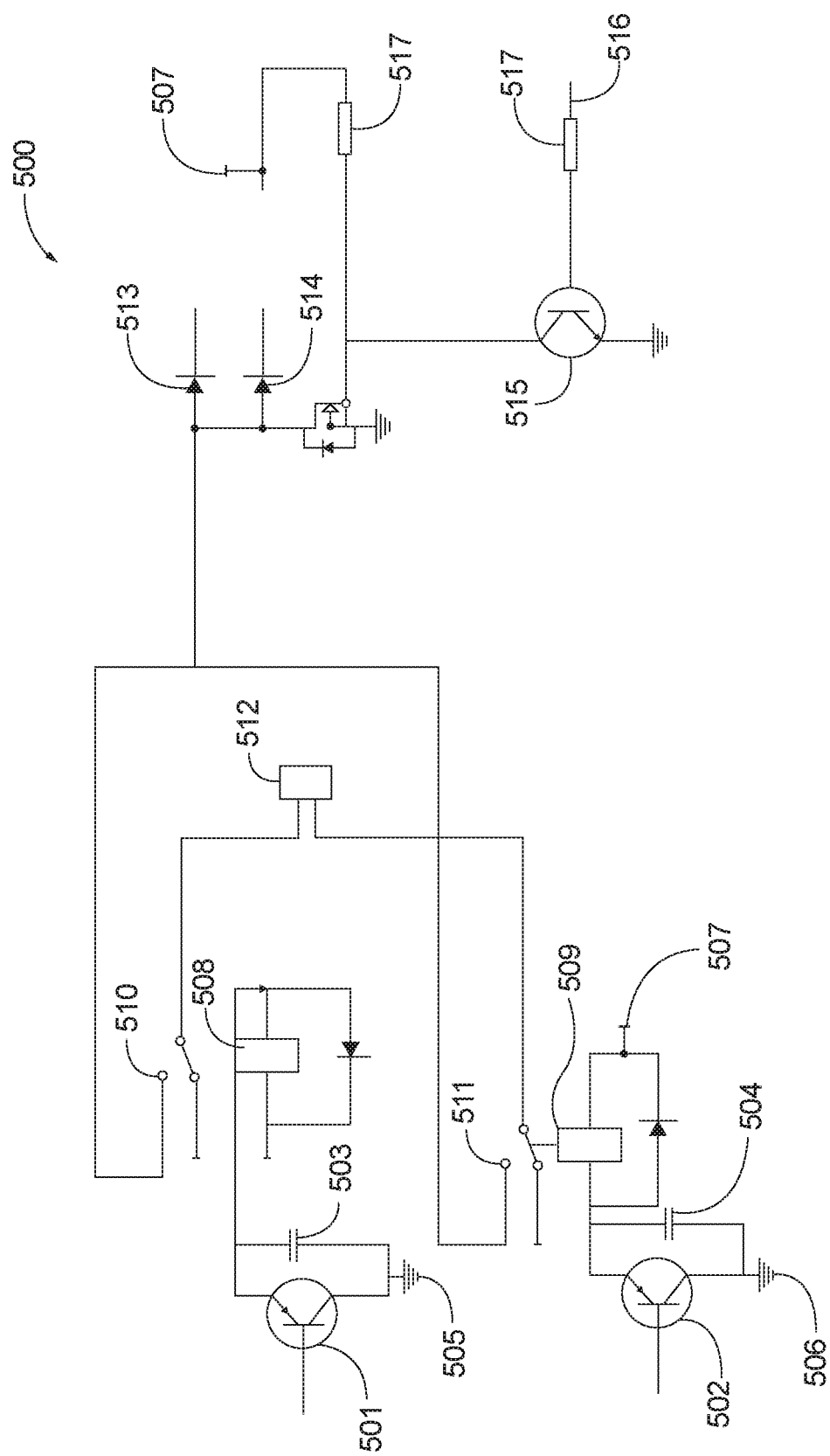
FIG. 5 is a schematic of an exemplary circuit board of an embodiment of the present disclosure.

FIG. 5 is a schematic 500 of an exemplary circuit board of an embodiment of the present disclosure using industry standard component representations as will be apparent to one of ordinary skill in the art. Each pedal may actuate a transistor such as a bipolar junction transistor (BJT), such as PNP BJT 501 and PNP BJT 502 which are configured to modulate power for acceleration or deceleration of at least one motor and may work in concert for a varied riding experience of a ride-on toy of the present disclosure. Each transistor circuit is connected to ground 505 and 506 and includes capacitors 503 and 504 which help enable power modulation to the motors and variable drive train actuation. Up to a 24-volt power supply such as a compatible battery 507 may be used to supply power to the motors in response to pedal actuation of the circuitry.

Relays 508 and 509 are provided for variable switching in response to pedal actuation along with a standard on-off type switching such as can be achieved by single-pole switches 510 and 511 connected to the power source for example via connector 512. Diodes 513 and 514 are provided for motor power conversion in response to pedal actuation. Grounded NPN-type BJT 515 may be provided for additional power control via pulse width modulator (PWM) 516. Resistance is provided between battery 507 and PWM 516 and the remaining circuitry via resistors 517. One of ordinary skill in the art will appreciate that other circuit configurations and components may be implemented within the scope of the claimed invention according to the availability of components and desired responsiveness of a microcontroller as described herein to signals from the pedal assemblies. The examples presented in the drawings are thus representative of example embodiments that may be altered to achieve similar results based on design capabilities.

What is claimed:

1. An electronic speed control system for use with a ride-on toy, the electronic speed control system comprising:
   at least one accelerator capable of modulating a throttle signal input in response to a first mechanical force;
   at least one brake capable of modulating a brake signal input in response to a second mechanical force;
   at least one microcontroller comprising an electrical circuit in electrical communication with the at least one throttle signal input and at least one brake signal input;
   at least one power source in electrical communication with the at least one microcontroller; and
   at least one motor connected to the electrical circuit, wherein power is provided to the at least one motor in response to the actuation of a first bipolar junction transistor by application of the first mechanical force and actuation of a second bipolar junction transistor by application of the second mechanical force by a rider of the ride-on toy;
   wherein the power provided to the at least one motor corresponds to a superposition of the first mechanical force and the second mechanical force.

2. The electronic speed control system of claim 1, wherein the at least one accelerator and at least one brake each comprise a pedal, wherein:
   when the accelerator is depressed the throttle signal input causes at least one motor to accelerate; and
   when the brake is depressed the brake signal input causes at least one motor to decelerate.

3. The electronic speed control system of claim 1, wherein the at least one power source is a battery.

4. The electronic speed control system of claim 3, wherein the electrical potential of the battery is at least 12 volts.

5. The electronic speed control system of claim 3, wherein the electrical potential of the battery is at least 24 volts.

6. A ride-on toy comprising an electronic speed control system, the electronic speed control system comprising:
   at least one accelerator capable of modulating a throttle signal input in response to a first mechanical force;
   at least one brake capable of modulating a brake signal input in response to a second mechanical force;
   at least one microcontroller comprising an electrical circuit in electrical communication with the at least one throttle signal input and at least one brake signal input;
   at least one power source in electrical communication with the at least one microcontroller; and
   at least one motor connected to the electrical circuit, wherein power is provided to the at least one motor in response to the actuation of a first bipolar junction transistor by application of the first mechanical force and actuation of a second bipolar junction transistor by application of the second mechanical force by a rider of the ride-on toy;
   wherein the power provided to the at least one motor corresponds to a superposition of the first mechanical force and the second mechanical force.

7. The ride-on toy of claim 6, wherein the at least one accelerator and at least one brake each comprise a pedal, wherein:
   when the accelerator is depressed the throttle signal input causes at least one motor to accelerate; and
   when the brake is depressed the brake signal input causes at least one motor to decelerate.

8. The ride-on toy of claim 6, wherein the at least one power source is a battery.

9. The ride-on toy of claim 8, wherein the electrical potential of the battery is at least 12 volts.

10. The ride-on toy of claim 8, wherein the electrical potential of the battery is at least 24 volts.

\* \* \* \* \*